Feb. 2, 1965    M. GLICKSMAN    3,168,321
COMPOSITE WASHER CONSTRUCTION
Filed Feb. 18, 1964

United States Patent Office 3,168,321
Patented Feb. 2, 1965

3,168,321
COMPOSITE WASHER CONSTRUCTION
Milton Glicksman, Teaneck, N.J., assignor to
Multi-Flex Seals, Inc., New York, N.Y.
Filed Feb. 18, 1964, Ser. No. 345,805
3 Claims. (Cl. 277—180)

This invention relates generally to the field of sealing washers, of a type adapted to be disposed beneath a screw head or similar fastening structure, and to be pressed against the flat surface of a sheet metal body or casing to effect a hermetic seal. Devices of this general type are known in the art, and the invention lies in specific constructional details disclosed herein.

As a concomitant of modern mass production techniques, very often holes are drilled to relatively large tolerances, and considerable non-uniformity in the size of the hole is thereby obtained. Where this hole is to be hermetically sealed, it is desirable to provide a sealing means which will accommodate for this wide variation in size, without adjustment on the part of the installing operator.

It is therefore among the principal objects of the present invention to provide an improved resilient composite washer construction in which the opening therein is of smaller diameter than the accommodated threaded shank of a fastener, wherein the same may be distorted to effect a hermetic seal about the threads of the shank.

Another object of the invention lies in the provision of an improved composite washer construction in which a second seal is established at the periphery of the washer against a planar surface disposed normal to the principle axis of the threaded shank.

A further object to the invention lies in the provision of an improved composite washer construction in which the resilient components thereof are substantially concealed upon the completion of installation.

Another object of the invention herein lies in the provision of an improved composite washer construction of the class described, and possessed of the above advantages, in which the cost of fabrication may be of a reasonably low order, thereby permitting consequent wide sale, distribution and use.

A feature of the invention lies in the fact that the effectiveness of the hermetic seal about the threaded shank of the fastener does not depend upon the degree to which the fastener is tightened.

Another feature of the invention lies in the fact that the resilient components of the device are not damaged upon installation, and may be reused, with reasonable care, as often as desired.

These objects and features as well as other incidental ends and advantages, will more fully appear in the progress on the following disclosure, and pointed out in the appended claims.

In the drawing to which reference will be made in the specification, similar reference characters have been employed to designate corresponding parts throughout the several views.

Figure 1:
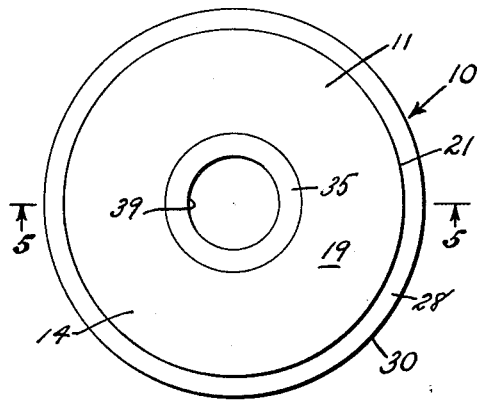
FIGURE 1 is a plan view of an embodiment of the invention.
Figure 2:
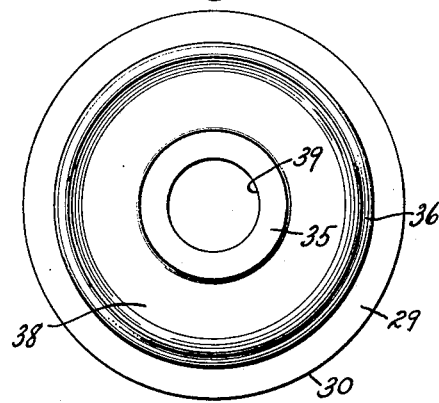
FIGURE 2 is a bottom plan thereof.
Figure 3:
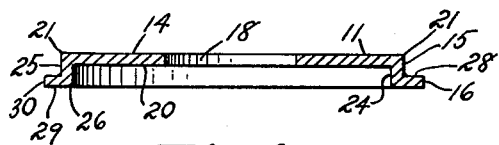
FIGURE 3 is a central longitudinal sectional view of the metallic washer element comprising a part of the embodiment.
Figure 4:
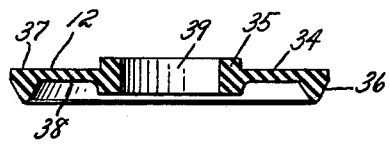
FIGURE 4 is a similar sectional view of a resilient washer element forming another part of the embodiment.

In accordance with the invention, the device, generally indicated by reference character 10, comprising broadly; a metallic washer element 11 and a resilient washer element 12.

The metallic washer element 11 may be formed from any suitable material, as for example sheet steel, brass, aluminum or stainless steel. It includes a planar main body member 14, an axially extending peripherally located cylindrical 15, and a planar peripheral flange 16. Most suitably, the element 11 may be formed as a metallic stamping.

The planar main member body 14 is provided with a centrally disposed through orifice 18, and is bounded by an upper surface 19, a lower surface 20, and an outer peripheral fold edge 21. The flange 15, as has been mentioned, is peripherally disposed with respect to the main body member, and is bounded by an inner surface 24, an outer surface 25 and a lower fold edge 26. The planar peripheral flange 16 is bounded by an upper surface 28, a lower surface 29 and an outer peripheral edge 30.

The resilient washer element 12 is preferably bonded to the metallic washer element 11, most conveniently by forming the element 12 in situ using insert molding techniques well known in the art. The element 12 includes a generally planar main body portion 34 to which is attached an inner annularly shaped member 35 of somewhat increased thickness as compared with the body portion 34. Disposed on the outer periphery of the main body portion 34 is an axially depending flange 36. The element 12 is bounded by an upper surface 37 bonded to the lower surface 20 of the member 14, and a lower surface 38. The inner member 35 defines a centrally disposed opening 39 adapted to be positioned coaxially with respect to the orifice 18, and of substantially smaller diameter. The opening 39 is of considerable depth, and forms an axially disposed cylindrical surface 40 of a distortable nature and capable of forming a hermetic seal upon a threaded shank inserted therethrough of dimension sufficiently larger than the effective unstressed diameter of the opening 39. The upper surface 41 of the member 35 is preferably in coplanar relation with respect to the upper surface 37 when the device is in unstressed condition, this relationship being maintained by the act of installation.

Figure 5:
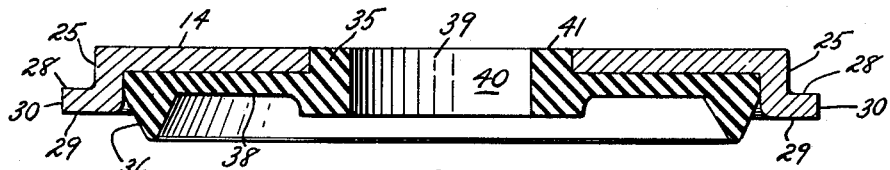
FIGURE 5 is a sectional view showing the device in assembled condition, and prior to tightening against a planar surface.
Figure 6:
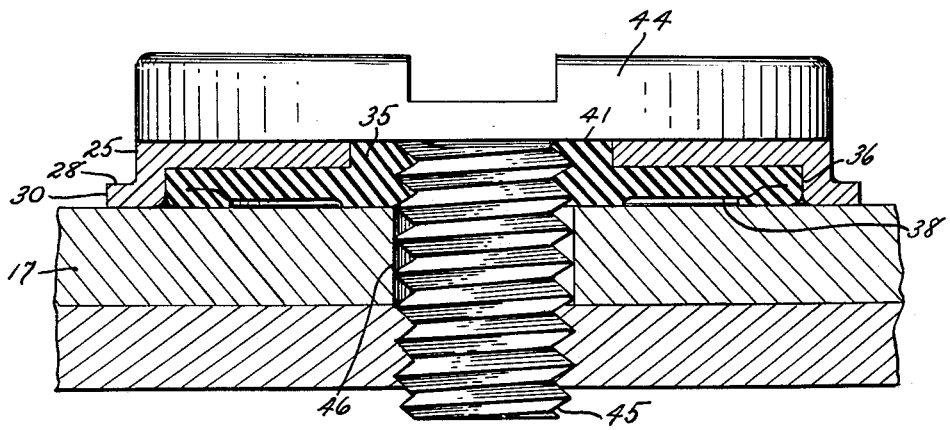
FIGURE 6 is a similar sectional view showing the device in an installed condition.

In installed condition, as seen in FIGURES 5 and 6, the bolt 44 or other fastening device is provided with threaded shank 45 of diameter substantially greater than that of the opening 39, and less than that of the orifice 18, so that upon tightening, the member 35 is distorted to effect a hermetic seal around the shank 45, and the edge 46 of the opening in the plate 47 or other surface. As the member 35 is of increased thickness over a substantial area, considerable tolerances in the opening in the plate 47 are automatically accommodated, any surplus resilient material being forced radially outwardly in the area of the main body 34. During the tightening of the bolt 44, the head of the same comes into contact with the upper surface 19, and continuous compressive force distorts the flange 36 to effect a hermetic seal between the metallic washer element 11 and the plate 47. Again, the space lying beneath the main body portion 34 provides a reservoir for the overflow of material comprising the flange 36.

I wish that it could be understood that I do not consider the invention limited to the precise details of structure shown and set forth in this specification, for obvious modifications will occur to those skilled in the art to which the invention pertains.

I claim:
1. A composite washer comprising: a metallic washer element and a resilient washer element bonded thereto;

said metallic washer element including a substantially planar main body member of arcuate periphery and having a centrally disposed orifice therein, an axially extending cylindrical flange peripherally positioned upon said main body member, and a planar peripheral flange positioned upon said central flange; said resilient washer element being bonded to a planar surface of said main body member, and including a centrally disposed portion of increased thickness relative to said main body member, and lying within the area of said centrally disposed orifice in said metallic washer element, said last mentioned centrally disposed portion having a through opening therein of lesser diameter than and disposed beneath said centrally disposed orifice in said metallic washer element.

2. A composite washer comprising: a metallic washer element and a resilient washer element bonded thereto; said metallic washer element including a substantially planar main body member of arcuate periphery and having a centrally disposed orifice therein, an axially extending cylindrical flange peripherally positioned upon said main body member, and a planar peripheral flange positioned upon said central flange; said resilient washer element being bonded to a planar surface of said main body member, and including a centrally disposed portion of increased thickness relative to said main body member, and lying within the area of said centrally disposed orifice in said metallic washer element, said last mentioned centrally disposed portion having a through opening therein of lesser diameter than and disposed beneath said centrally disposed orifice in said metallic washer element: said cylindrical flange being of a depth greater than the thickness of said main body member of said resilient washer element.

3. A composite washer comprising: a metallic washer element and a resilient washer element bonded thereto; said metallic washer element including a substantially planar main body member of arcuate periphery and having a centrally disposed orifice therein, an axially extending cylindrical flange peripherally positioned upon said main body member, and a planar peripheral flange positioned upon said central flange; said resilient washer element being bonded to a planar surface of said main body member, and including a centrally disposed portion of increased thickness relative to said main body member, and lying within the area of said centrally disposed orifice in said metallic washer element, said last mentioned centrally disposed portion having a through opening therein of lesser diameter than and disposed beneath said centrally disposed orifice in said metallic washer element; said resilient washer element having a flange thereon, depending axially from the main body member thereof.

References Cited by the Examiner

UNITED STATES PATENTS

| | | | |
|---|---|---|---|
| 2,395,243 | 2/46 | Aukers. | |
| 2,643,904 | 1/53 | Wehmann. | |
| 2,761,347 | 9/56 | McKee | 277—32 X |
| 2,949,235 | 8/60 | Nenzell | 277—180 |
| 3,009,722 | 11/61 | Augustin | 277—235 X |

EDWARD V. BENHAM, *Primary Examiner.*